No. 883,434. PATENTED MAR. 31, 1908.
G. B. WAITE.
CENTERING FOR FIREPROOF FLOOR CONSTRUCTIONS.
APPLICATION FILED APR. 16, 1906.

4 SHEETS—SHEET 1.

Witnesses:
Chas. E. Gaylord.
John Enders.

Inventor:
Guy B. Waite,
By Samuel N. Pond
Atty.

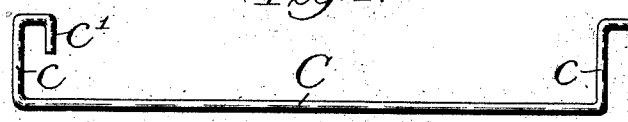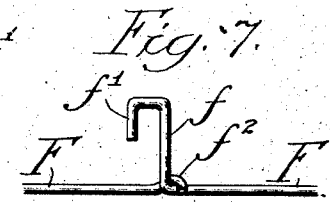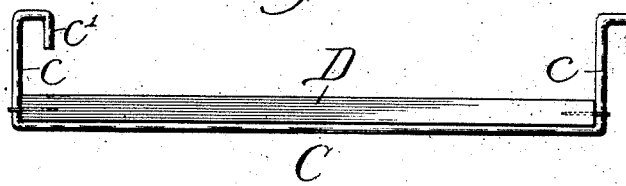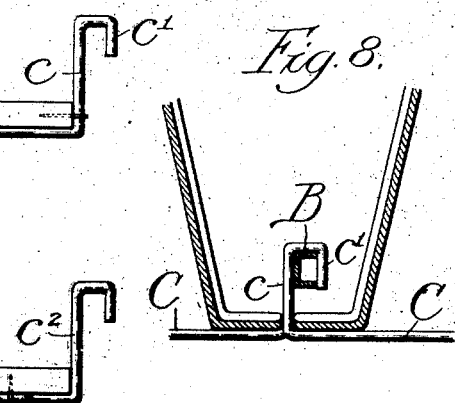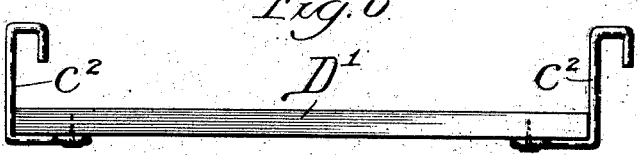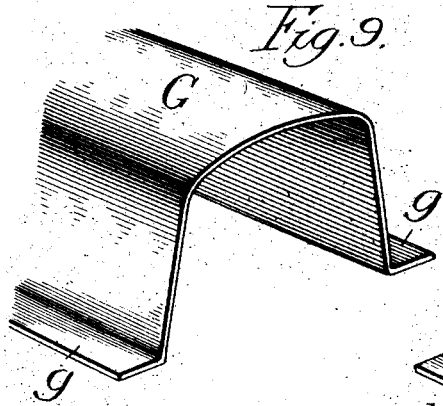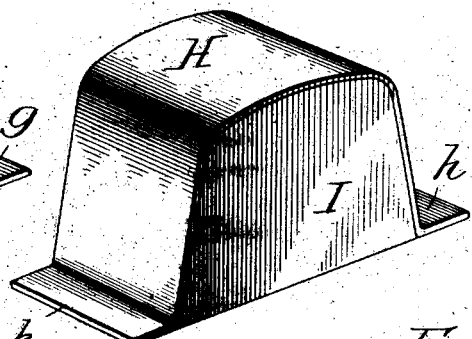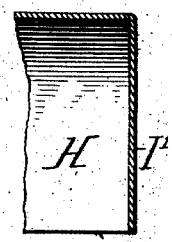

No. 883,434. PATENTED MAR. 31, 1908.
G. B. WAITE.
CENTERING FOR FIREPROOF FLOOR CONSTRUCTIONS.
APPLICATION FILED APR. 16, 1906.

4 SHEETS—SHEET 4.

Witnesses:
Inventor:
Guy B. Waite,
By Samuel N. Pond,
Atty.

UNITED STATES PATENT OFFICE.

GUY B. WAITE, OF NEW YORK, N. Y.

CENTERING FOR FIREPROOF FLOOR CONSTRUCTIONS.

No. 883,434.   Specification of Letters Patent.   Patented March 31, 1908.

Application filed April 16, 1906. Serial No. 311,986.

To all whom it may concern:

Be it known that I, GUY B. WAITE, a citizen of the United States, residing in the city, county, and State of New York, have invented certain new and useful Improvements in Centering for Fireproof Floor Constructions, of which the following is a specification.

This invention pertains to centering or supporting devices for concrete and similar floor constructions; and has for its object to provide a simple and inexpensive structure capable of being assembled in a rapid and convenient manner. One feature of the invention resides in a novel extensible and contractible mold or centering member proper which is preferably made of some thin metal of a general inverted U-shape or arch form in cross-section with removable or permanent closures at the ends to define the concrete surface at those points.

Another feature of the invention resides in a novel form of hanger for supporting the molds without leaving objectionable gaps in the concrete when the centering has been removed.

Other minor features will appear in the following description of the drawings, representing preferred forms of the invention, in which—

Figure 1:
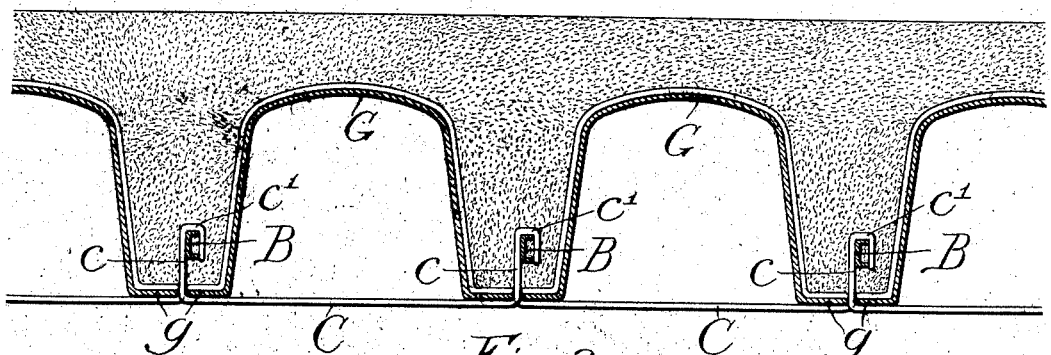
Figure 2:
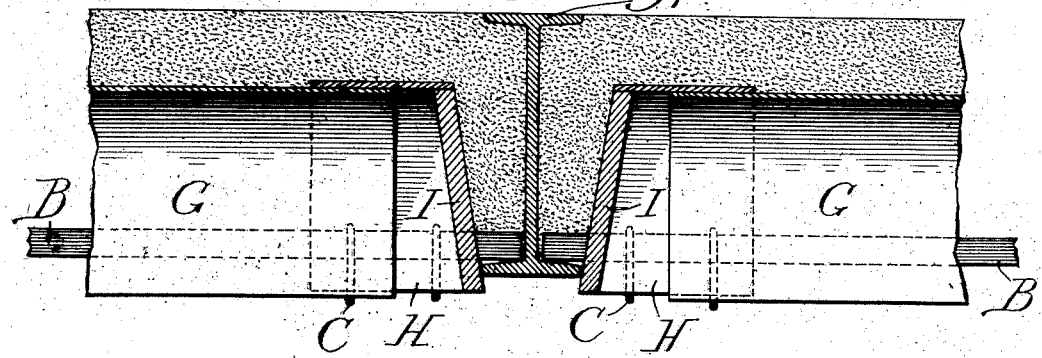
Figure 3:
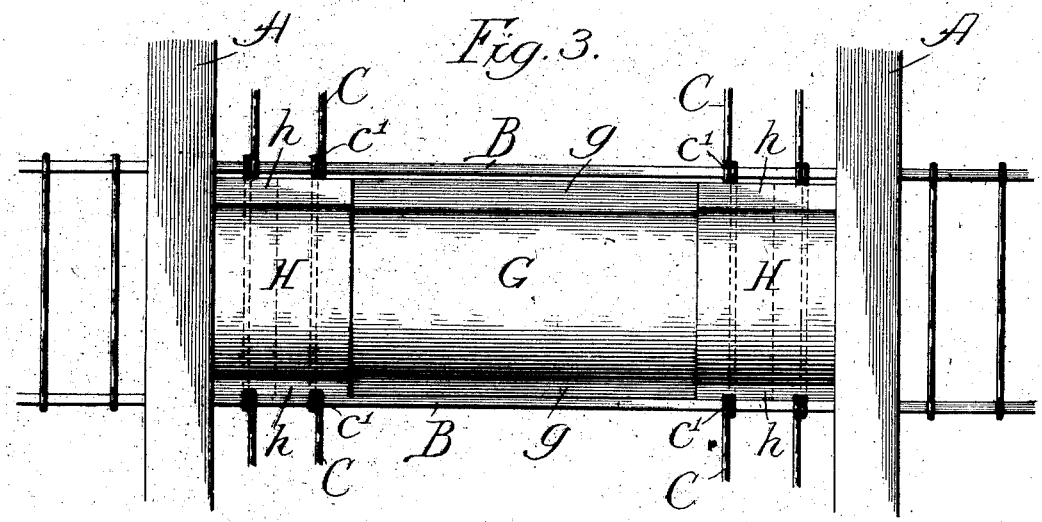
Figure 14:
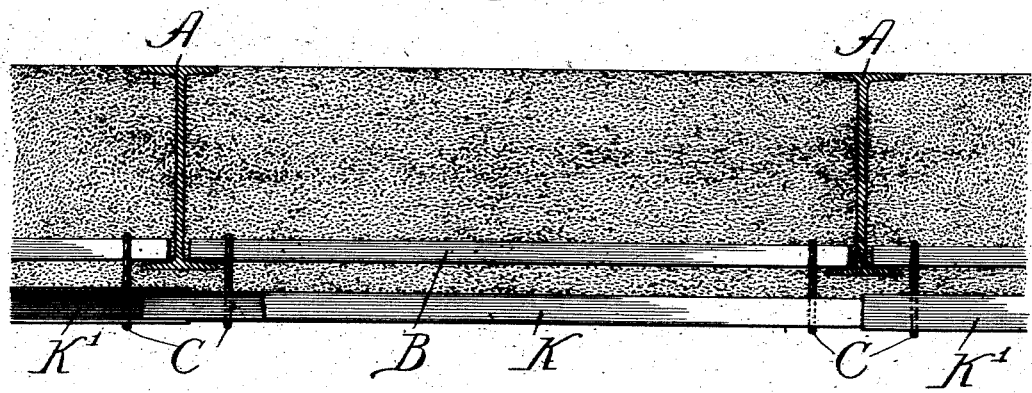
Figure 15:
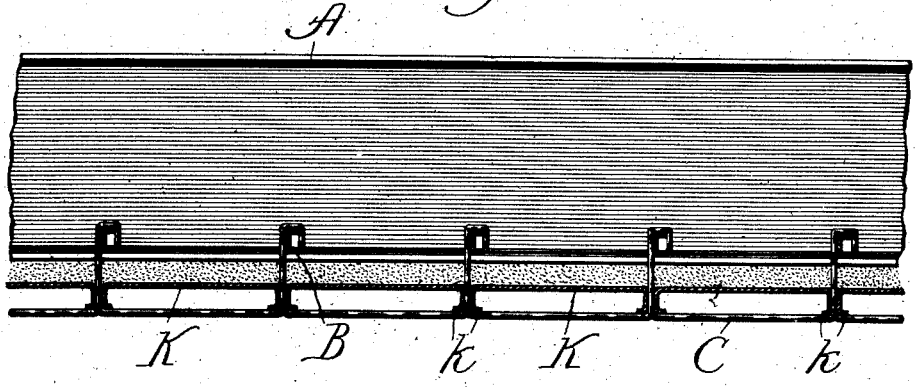
Figure 16:
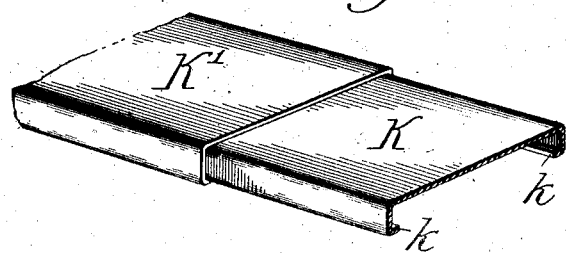
Figure 17:
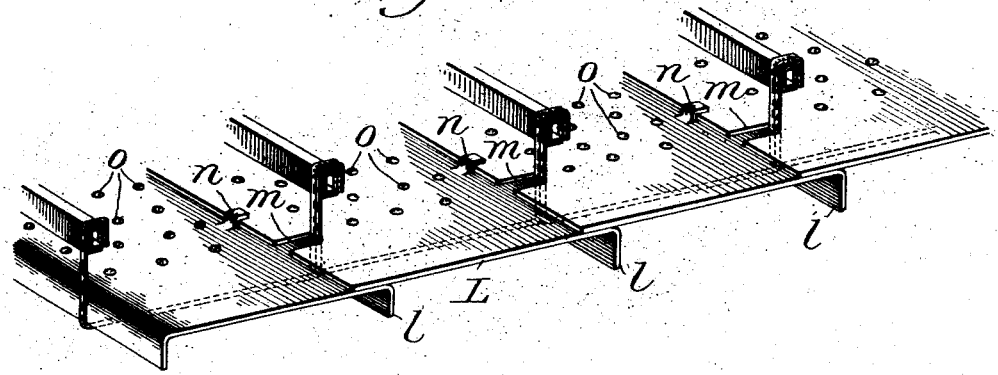
Figure 18:
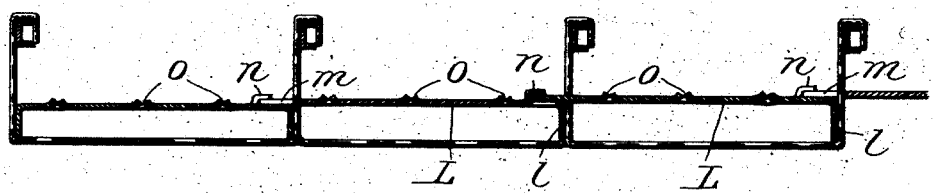
Figure 19:
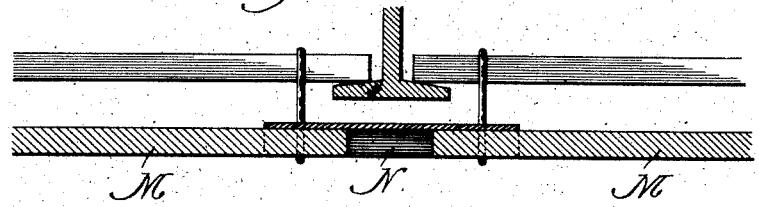
Figure 20:
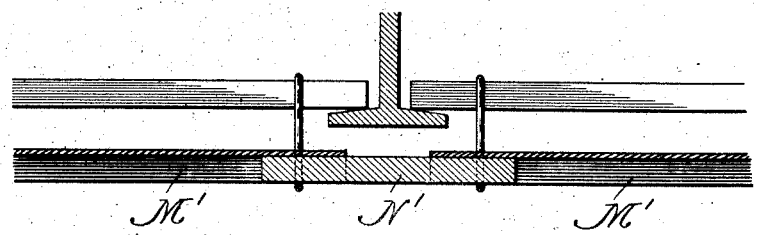

Figure 1 is a cross-sectional view of a floor structure employing my improved centering, the section being parallel with the floor-beams and transverse to the molds or centers; Fig. 2 is a section at right-angles to the section of Fig. 1; Fig. 3 is a top plan view of the floor-beams and centering, the concrete being omitted; Figs. 4, 5, 6 and 7 are detail side elevational views of various forms of my improved hanger; Fig. 8 is a detail cross-sectional view through the adjacent sides of two molds and the intermediate supporting-bar; Fig. 9 is a perspective view of an end portion of the intermediate member of the mold or center; Fig. 10 is a perspective view of an end member of the mold or center closed at the end by a wooden or other closure; Fig. 11 is a longitudinal section through an end member having an integral end closure; Fig. 12 shows a form of hanger at present in use, on which my present hanger is an improvement; Fig. 13 is a comparative view, similar to Fig. 8, illustrating a defect of the style of hanger shown in Fig. 12; Figs. 14 and 15 are views similar to Figs. 2 and 1, respectively, showing my improvements as applied to the construction of a flat arch; Fig. 16 is a perspective view showing the form and telescopic relation of the molds or centers used in the flat arch construction shown in Figs. 14 and 15; Figs. 17 and 18 are perspective and cross-sectional views, respectively, of a modified form of sheet-metal centers, wherein one edge of each center is supported on the edge of the next adjacent center: and figs 19 and 20 are sectional views, illustrating forms of combination wood and metal centers.

Referring to the drawings, A designates the usual floor beams of I-beam form, and B designates a series of relatively light bars, herein shown as channels, extending between adjacent floor-beams and stepped at their ends on the lower flanges thereof. On the bars B are suspended near the points of support of said bars on the floor-beams, hangers which form the direct supports of the molds or centers.

Figs. 4, 5, 6 and 7 show a variety of forms of hanger, all of which are within the scope and purview of my invention. In Fig. 4 the hanger consists simply of a metal rod C having its end portions $c$ bent up and terminating in hooks $c'$, both of which turn in the same direction. In Fig. 5 the hanger of Fig. 4 is stiffened or reinforced by a stiffening-piece D secured thereto at its ends. In Fig. 6 the stiffening-piece D' alone forms the intermediate portion of the hanger, the inwardly bent shanks of the hooks $c^2$ being secured thereto as shown. Fig. 12 illustrates an old form of hanger E of this class in which the hooks $e$ at the ends are turned in opposite directions. Fig. 13 shows how, when the molds or centers are supported by hangers of this old form hung from the bars B, a gap in the concrete filling necessarily occurs beneath the bars B; and Fig. 8 shows how my improved hanger obviates this by allowing the edges of adjacent molds or centers to substantially meet beneath the bars. Fig. 7 shows another form of hanger capable of effecting the purpose of my invention in this respect, the same consisting of a rod F the end portion $f$ of which at one end is turned upwardly and bent to form a hook $f'$, while at its opposite end a small hook $f^2$ is formed adapted to overlie and rest upon the adjacent hangers just behind the upwardly turned end portion $f$ thereof.

The molds or centers, which form the direct supports or carrying members of the concrete filling material and give it the desired arch formation on its under side, are of a general inverted U-shape or arch form in cross-section, each consisting, in the principal form shown in Figs. 1 to 3 and 9 to 11, of an intermediate member G, and telescoping end sections H, whereby the mold is made longitudinally extensible and contractible to fit different lengths of span. These members are conveniently and preferably made of sheet metal pressed to the desired form, and have along their horizontal margins laterally projecting flanges $g$ and $h$, respectively. The outer ends of the end sections may be closed as by an inserted wooden or other closure I (Figs. 2 and 10), or the end closure may consist of an integral end wall I' (Fig. 11). Or the end closures I and I' may be omitted and the end section H carried up against the web of beam A, being notched or cut away to override the base flange of the beam.

Figs. 14, 15 and 16 show the invention as applied to the construction of a flat arch wherein the concrete filling extends to or below the lower edge of the floor-beams. In this construction the molds or centers K and K' lying between adjacent floor-beams may each consist of a single shallow channel section, the sections K and K', which are longitudinally alined, telescoping each other beneath the floor-beams, as plainly shown in Figs. 14 and 16. The low side walls of these sections may be stiffened by inwardly turned flanges $k$, if desired.

It will be observed that in all cases the light bars B are embedded in the concrete and become permanent reinforcements of the tension region of the concrete ribs or beams formed between the sides of the molds (Fig. 1) or above the latter (Fig. 14). The molds or centers may be removed and used over again by clipping off the hooks of the hangers, or they may remain as a permanent centering where desired. The flanges $g$ and $h$ help to stiffen the upright part of the centers G and H as well as to complete the centering.

So far as the novel form and structure of the molds or centers is concerned it is evident that other supports than the bars and hangers might be employed; and, conversely, the latter can advantageously be used with other forms of molds or centers than those shown and described. For instance, when temporary wooden or other supports are used on which the sheet iron centers rest, the flanges $g$ and $h$ are not necessary; and the centering can be raised or lowered to suit the height of the arch by raising or lowering such temporary supports. Such temporary supports would advantageously be used where the concrete was strong enough not to require the tension-bars B, in which case the latter would be omitted. But the combination of the features herein shown provides a simple, light, strong and readily adjustable centering construction well adapted to the erection of concrete floors of the type shown and described. In cases where the supporting bars B are used not only as a reinforcement to the concrete but to support the molds or centers, as shown, it is an advantage to make the mold or center cover the central portion of the span between the floor-beams and serve as a carrying beam to uphold the concrete and carry the loads thereof, through the hangers, to points on the bars close to the supports of the latter on the floor-beams, since relatively light bars, well adapted to serve as tensile concrete reinforcements, can thus be used.

Figs. 17 and 18 show a modified form of sheet-iron molds or centers L, having a side wall 1 on only one side (except at the end of the series), the opposite edge of the center overlapping and resting on the next adjacent center, and having notches $m$ to accommodate the vertical portions of the hangers. Said edges may also lie beneath guiding and locking teeth $n$ punched up from the flat upper surfaces of the adjacent centers, as shown. Preferably, also, the upper surface of the center is roughened, as prick-punching indicated at $o$ to more securely anchor the concrete. Of course, these centers may be otherwise supported; and it may be mentioned that they can be used in place of board sheathing for the construction of partitions or walls.

In the modifications shown in Figs. 19 and 20, the telescoping members of the centering are alternately of wood and sheet metal. In Fig. 19 the long supporting members M may be a wooden beam or plank, the connecting member N being a hollow metal piece. Fig. 20 shows the converse of this arrangement, wherein the long supporting members M' are of hollow metal, telescoping at their ends over a short wooden connecting piece N'. This form of centering is especially adaptable to flat arches.

I claim:—

1. In a centering construction, the combination with a mold or center consisting of a plurality of telescoping sections of arch-shape in cross-section, each provided with integral laterally projecting marginal flanges adapted to support the filling material between laterally adjacent molds, of hangers each extending between and beneath said flanges and supporting said mold sections, substantially as described.

2. In a centering construction, the combination with a series of bars extending between and supported at their ends on adjacent floor-beams, of a series of arch-shaped molds lying between and parallel with said bars and having marginal flanges extending laterally beneath the latter, and hangers supporting said molds from said bars and permitting the latter to be embedded on all sides in the filling material, substantially as described.

3. In a centering construction, the combination with a series of bars extending between and supported on adjacent floor beams, of hangers having hooks turned in the same direction hung from and across said bars, and molds or centers supported on said hangers, substantially as described.

4. In a centering construction, the combination with a series of bars extending between and supported at their ends on adjacent floor beams, of hangers having hooks turned in the same direction hung from and across said bars, and molds or centers supported on said hangers and provided with lateral flanges that extend beneath said bars, substantially as described.

5. In a centering construction, a multipart extensible and contractible mold or center consisting of a main intermediate section of a general arch-form in cross-section and end sections of the same form telescoping therewith, said end sections being closed at their outer ends to support and give form to the filling material lying thereagainst, substantially as described.

GUY B. WAITE.

Witnesses:
JESSE GRANT ROE,
LEONARD O. ROE.